United States Patent
Chen et al.

(10) Patent No.: US 10,578,818 B1
(45) Date of Patent: Mar. 3, 2020

(54) OPTICAL TRANSCEIVER

(71) Applicant: Prime World International Holdings Ltd., New Taipei (TW)

(72) Inventors: Yu Chen, New Taipei (TW); Hsuan-Chen Shiu, New Taipei (TW); Che-Shou Yeh, New Taipei (TW)

(73) Assignee: Prime World International Holdings Ltd., New Taipei (TW)

( * ) Notice: Subject to any disclaimer, the term of this patent is extended or adjusted under 35 U.S.C. 154(b) by 0 days.

(21) Appl. No.: 16/153,685

(22) Filed: Oct. 5, 2018

(51) Int. Cl.
*G02B 6/42* (2006.01)
*H01R 13/627* (2006.01)

(52) U.S. Cl.
CPC ....... *G02B 6/4284* (2013.01); *H01R 13/6275* (2013.01)

(58) Field of Classification Search
CPC .............. H01R 13/627; H01R 13/6271; H01R 13/6272; H01R 13/6275; H01R 13/62933; G02B 6/4284
USPC ........ 385/76, 77, 88, 92; 398/139, 200, 201, 398/212, 214; 439/133, 304, 345, 346, 439/350, 352, 353, 354, 357, 358, 370
See application file for complete search history.

(56) References Cited

U.S. PATENT DOCUMENTS

| 7,699,641 | B2 * | 4/2010 | Bright | ................ H01R 13/6275 439/352 |
| 9,720,189 | B1 * | 8/2017 | Wang | ..................... G02B 6/387 |
| 2005/0191892 | A1 | 9/2005 | Ishigami et al. | |
| 2011/0081114 | A1 * | 4/2011 | Togami | ................ G02B 6/4246 385/76 |
| 2012/0106902 | A1 | 5/2012 | Thirugnanam et al. | |
| 2014/0134898 | A1 * | 5/2014 | Wang | ................. H01R 13/6275 439/843 |
| 2015/0093083 | A1 * | 4/2015 | Tsai | ....................... G02B 6/423 385/92 |
| 2017/0363828 | A1 * | 12/2017 | Zhu | ......................... G02B 6/42 |

OTHER PUBLICATIONS

United States Non-Final Office Action related to U.S. Appl. No. 16/167,864 dated Feb. 25, 2019.

* cited by examiner

*Primary Examiner* — Robert Tavlykaev
(74) *Attorney, Agent, or Firm* — Grossman Tucker Perreault & Pfleger, PLLC

(57) ABSTRACT

An optical transceiver includes a main body, an elastic component and a fastening component. The main body includes two lateral surfaces and an outer surface between the two lateral surfaces, and the outer surface defines a confined groove. The elastic component is disposed in the confined groove. The fastening component is movably disposed on the main body. The fastening component includes a linkage arm, two extending arms and a confined portion. The linkage arm is disposed on the outer surface of the main body, and the two extending arms are connected with the linkage arm. The two extending arms are respectively disposed on the two lateral surfaces. The confined portion is connected with the linkage arm and extends into the confined groove in order to press the elastic component. The two extending arms are detachably fasten-able with the cage.

12 Claims, 8 Drawing Sheets

OPTICAL TRANSCEIVER

TECHNICAL FIELD

The disclosure relates to an optical communication device, more particularly to a pluggable optical transceiver.

BACKGROUND

Optical transceivers are generally installed in electronic communication facilities in modern high-speed communication networks. In order to make flexible the design of an electronic communication facility and less burdensome the maintenance of the same, an optical transceiver is inserted into a corresponding cage that is disposed in the communication facility in a pluggable manner. In order to define the electrical-to-mechanical interface of the optical transceiver and the corresponding cage, different specifications such as XFP (10 Gigabit Small Form Factor Pluggable) used in 10 GB/s communication rate, QSFP (Quad Small Form-factor Pluggable), or other form factors at different communication rates.

A fastening mechanism is provided for securely fixing the optical transceiver to the cage. On the other hand, the optical transceiver must include a releasing mechanism so that the optical transceiver could be released from the cage smoothly when necessary.

SUMMARY

According to one aspect of the present disclosure, an optical transceiver is disclosed. Such disclosed optical transceiver in one embodiment includes a main body, an elastic component and a fastening component. The main body includes two lateral surfaces and an outer surface between the two lateral surfaces, and the outer surface defines a confined groove. The elastic component is disposed in the confined groove. The fastening component is movably disposed on the main body. The fastening component includes a linkage arm, two extending arms and a confined portion. The linkage arm is disposed on the outer surface of the main body, and the two extending arms are connected with the linkage arm. The two extending arms are respectively disposed on the two lateral surfaces. The confined portion is connected with the linkage arm and extends in the confined groove in order to press the elastic component. The two extending arms are detachably fasten-able with the cage.

According to another aspect of the present disclosure, an optical transceiver is disclosed. Such disclosed optical transceiver in one embodiment includes a main body, two elastic components and a fastening component. The main body includes two lateral surfaces and an outer surface between the two lateral surfaces, and the outer surface defines two confined grooves spaced apart from each other. The two elastic components are disposed in the two confined grooves, respectively. The fastening component is movably disposed on the main body. The fastening component includes a linkage arm, two extending arms and two confined portions. The linkage arm is disposed on the outer surface of the main body, and the two extending arms are connected with the linkage arm. The two extending arms are respectively disposed on the two lateral surfaces. The confined portions are connected with the linkage arm and are respectively extend into the two confined grooves in order to press the two elastic components. The two extending arms are detachably fasten-able with the cage.

BRIEF DESCRIPTION OF THE DRAWINGS

The present disclosure will become more fully understood from the detailed description given below and the accompanying drawings which are given by way of illustration only and thus are not intending to limit the present disclosure and wherein.

DETAILED DESCRIPTION

Figure 1:
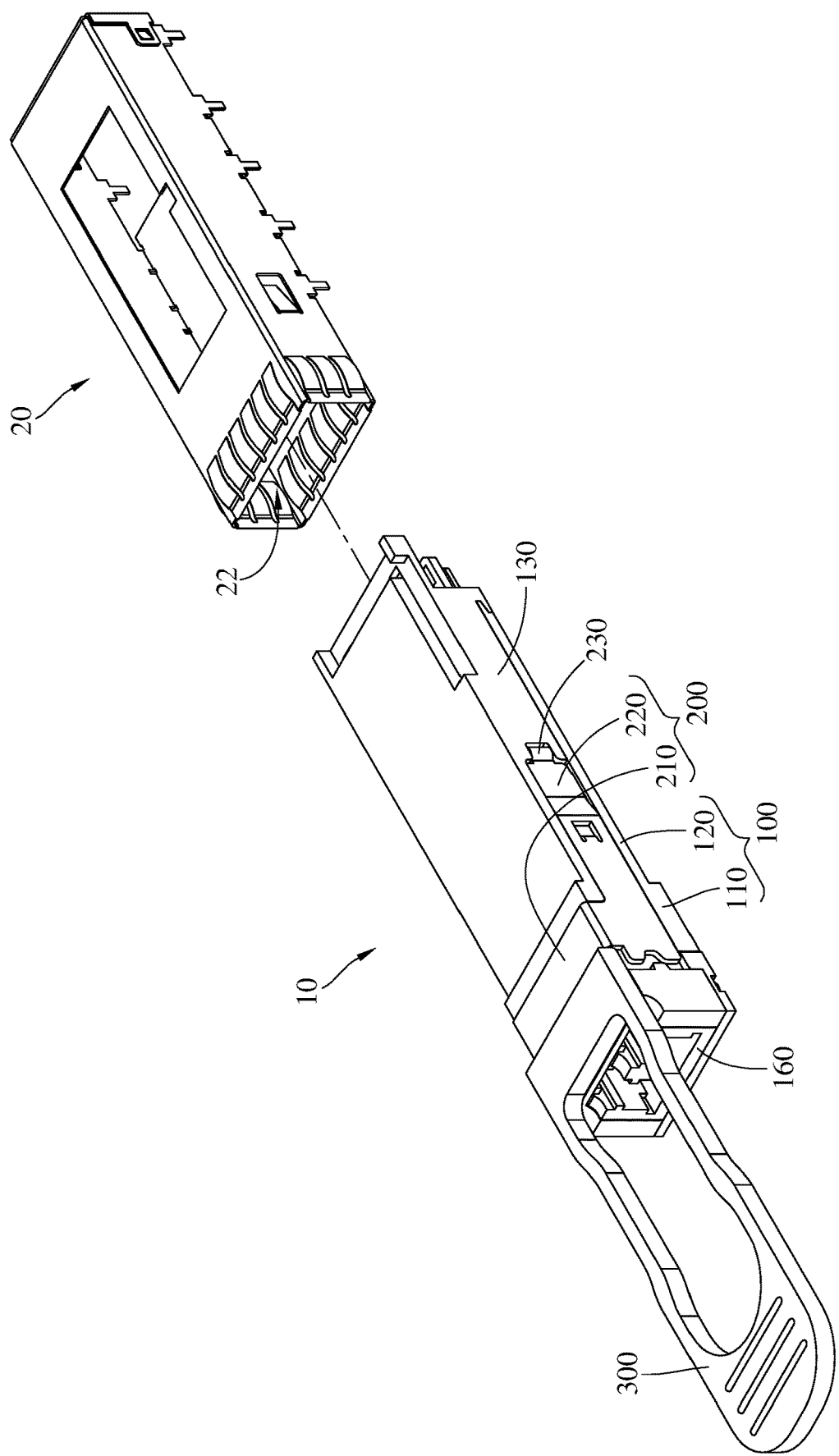
FIG. 1 is a perspective view of an optical transceiver and a cage according to a first embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
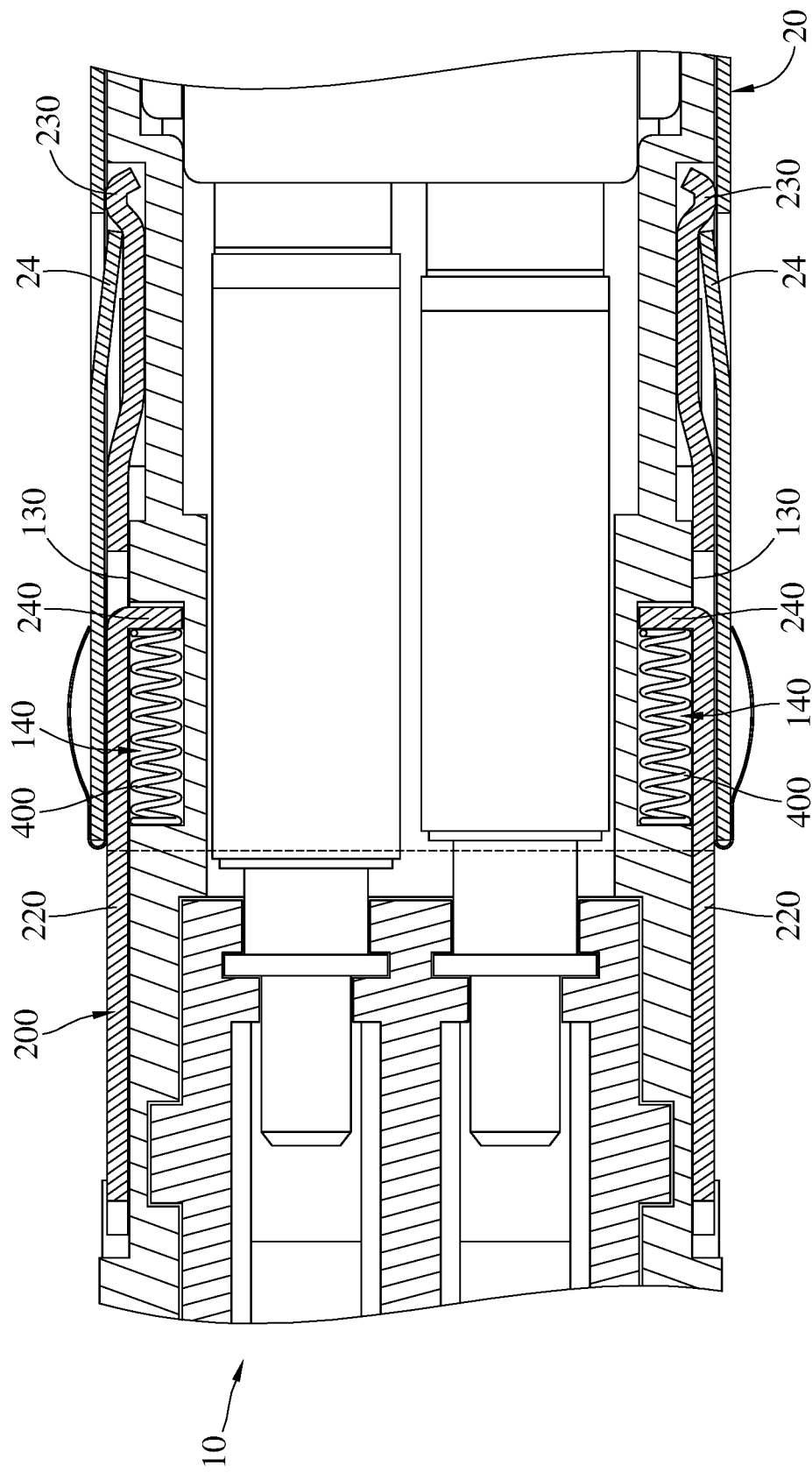
FIG. 2 is a partially enlarged view of the optical transceiver in FIG. 1, with a fastening component at a fastening position.

Please refer to FIG. 1 and FIG. 2. FIG. 1 is a perspective view of an optical transceiver and a cage according to a first embodiment of the present disclosure. FIG. 2 is a partially enlarged view of the optical transceiver in FIG. 1, with a fastening component at a fastening position. In this embodiment, an optical transceiver 10 is disclosed, and the optical transceiver 10 is inserted into a cage 20 in pluggable manner. The optical transceiver 10 includes a main body 100, a fastening component 200, a bail 300 and two elastic components 400.

The main body 100, for example, is a housing including a head portion 110 and an insertion portion 120 connected with each other. The insertion portion 120 is configured to be inserted into a plugging slot 22 of the cage 20. The head portion 110 of the optical transceiver 10 includes two lateral surfaces 130, two sliding rails and two confined grooves 140. The two sliding rails are respectively formed on the two lateral surfaces 130 and extend from the head part 110 to the insertion portion 120. The two confined grooves 140 are respectively formed on the two lateral surfaces 130 for accommodating the two elastic components 400.

The fastening component 200 includes a linkage arm 210 and two extending arms 220. The two extending arms 220 are respectively connected with two opposite ends of the linkage arm 210, such that the linkage arm 210 is located between the two extending arms 220. The two extending arms 220 are movably disposed on the sliding rails at the lateral surfaces 130, respectively. Each of the extending arms 220 includes a fastening portion 230 and a confined portion 240. The fastening portion 230 extends along a direction far away from the lateral surface 130 to be detachably fasten-able with the cage 20. The confined portion 240 extends into the confined groove 140 for pressing the elastic component 400.

The bail 300 is connected with the linkage arm 210 of the fastening component 200 and extends outside from the main body 100. The bail 300 is made of rubber and bendable to be in front of the head part 110 or on the top of the head part 110.

The elastic components 400 constantly press the confined portion 240 of the fastening component 200. It is worth noting that numbers of the confined grooves 140 and the elastic components 400 are not limited in view of embodiments in the present disclosure.

Figure 3:
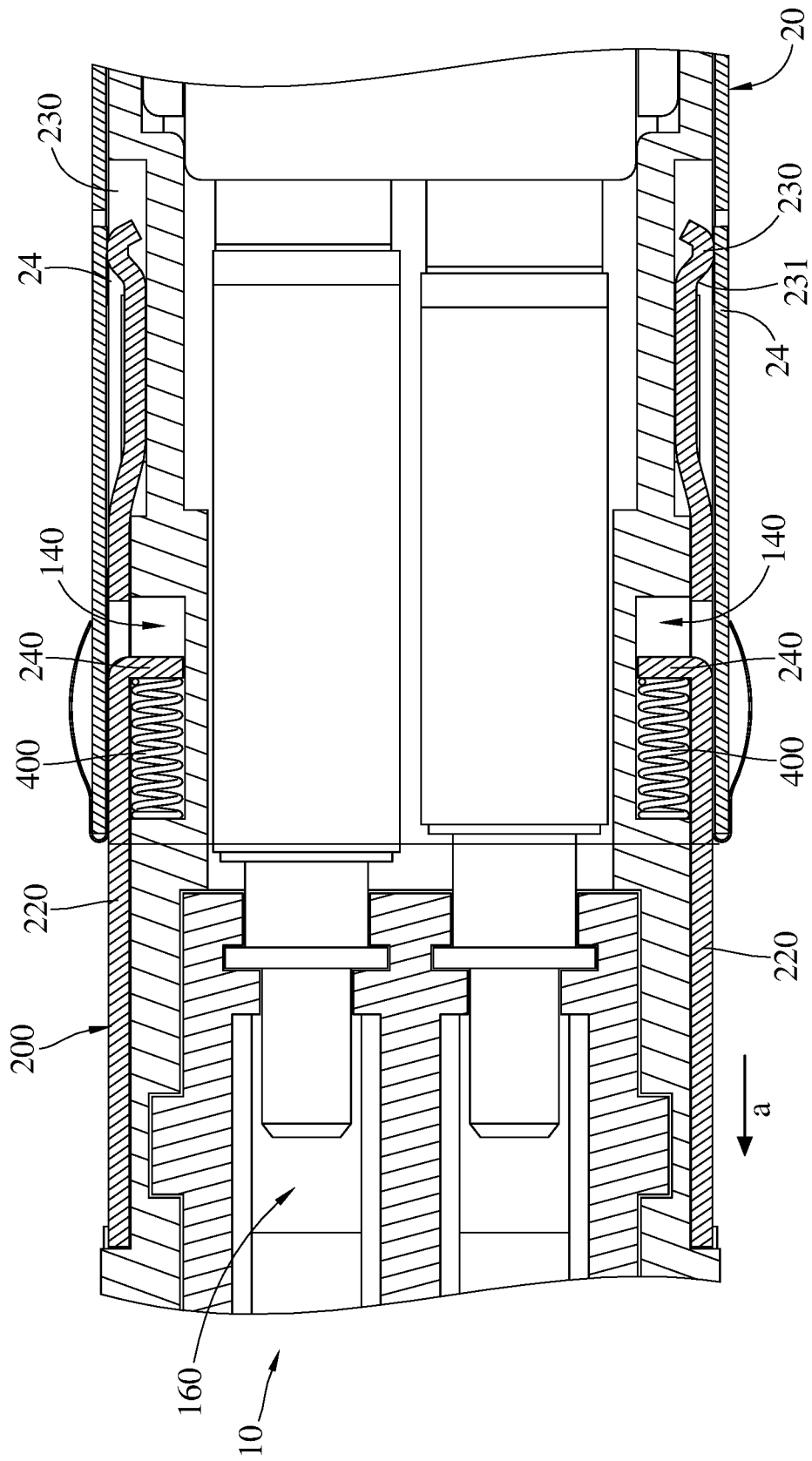
FIG. 3 is a partially enlarged cross-sectional view of the optical transceiver in FIG. 1, with the fastening component at a releasing position.

The fastening component 200 is movable relative to the main body 100 to be at either a fastening position (as shown in FIG. 2) and a releasing position (as shown in FIG. 3). Please refer to FIG. 2 and FIG. 3. FIG. 3 is a partially enlarged cross-sectional view of the optical transceiver in FIG. 1, with the fastening component at a releasing position.

In FIG. 2, the two elastic components 400 respectively press the two confined portions 240 so that the fastening component 200 could be located at the fastening position, and thus the fastening portions 230 are securely fastened with the cage 20. Therefore, the optical transceiver 10 is readily and reliably inserted into the plugging slot 22 of the cage 20.

The bail 300 is able to be drawn along the direction indicated by an arrow a. In FIG. 3, the fastening component 200 is moved by the bail 300 relative to the main body 200 to be at the releasing position. The fastening portion 230 presses a flexible arm 24 of the cage 20 so that the fastening component 200 slides along an inclined surface 231 of the fastening portion 230. The fastening portion 230 bends the flexible arm 24 to allow the fastening component 200 to move to the releasing position. The insertion portion 120 of the main body 100 is removed from the cage 20 when the bail 300 is pulled much farther.

When the fastening component 200 is at the releasing position, the two confined portions 240 respectively compress the two elastic components 400. As the bail 300 is released, the elastic energy stored in the elastic components 400 drives the fastening component 200 back to the fastening position.

The bail 300 could be moved around to be located above the head part 110 of the main body 100, creating some room for an optical fiber plug (not shown in the drawings) to be plugged into an optical fiber terminal 160 more conveniently.

In the first embodiment, that the bail 300 could help move the fastening component 200 renders possible the fastening component to fasten to or be released from the cage.

In the first embodiment, the elastic component 400 is disposed in the confined groove 140 which is formed on the lateral surface 130 of the main body 100, and the confined portion 240 of the extending arm 220 presses the elastic component 400. However, since the trend of evolution of the optical transceiver 10 somewhat focuses on the reduction in size of the entire transceiver as well as the inside space of the main body 100. In order to form the confined grooves 140 on the lateral surfaces 130, the space inside the main body 100 is restricted in a width direction, such that it is unfavorable for the arrangement of electronic components such as multiple transmitters and multiple receivers.

Furthermore, the bail 300 could be moved around with respect to the main body 100 in the first embodiment. However, absent application of any external force may make the bail 300 simply go back to its initial position, such that extra maneuver of the bail 300 is required for any optical fiber to be plugged into the optical fiber terminal 160 (which might be a switch).

Figure 4:
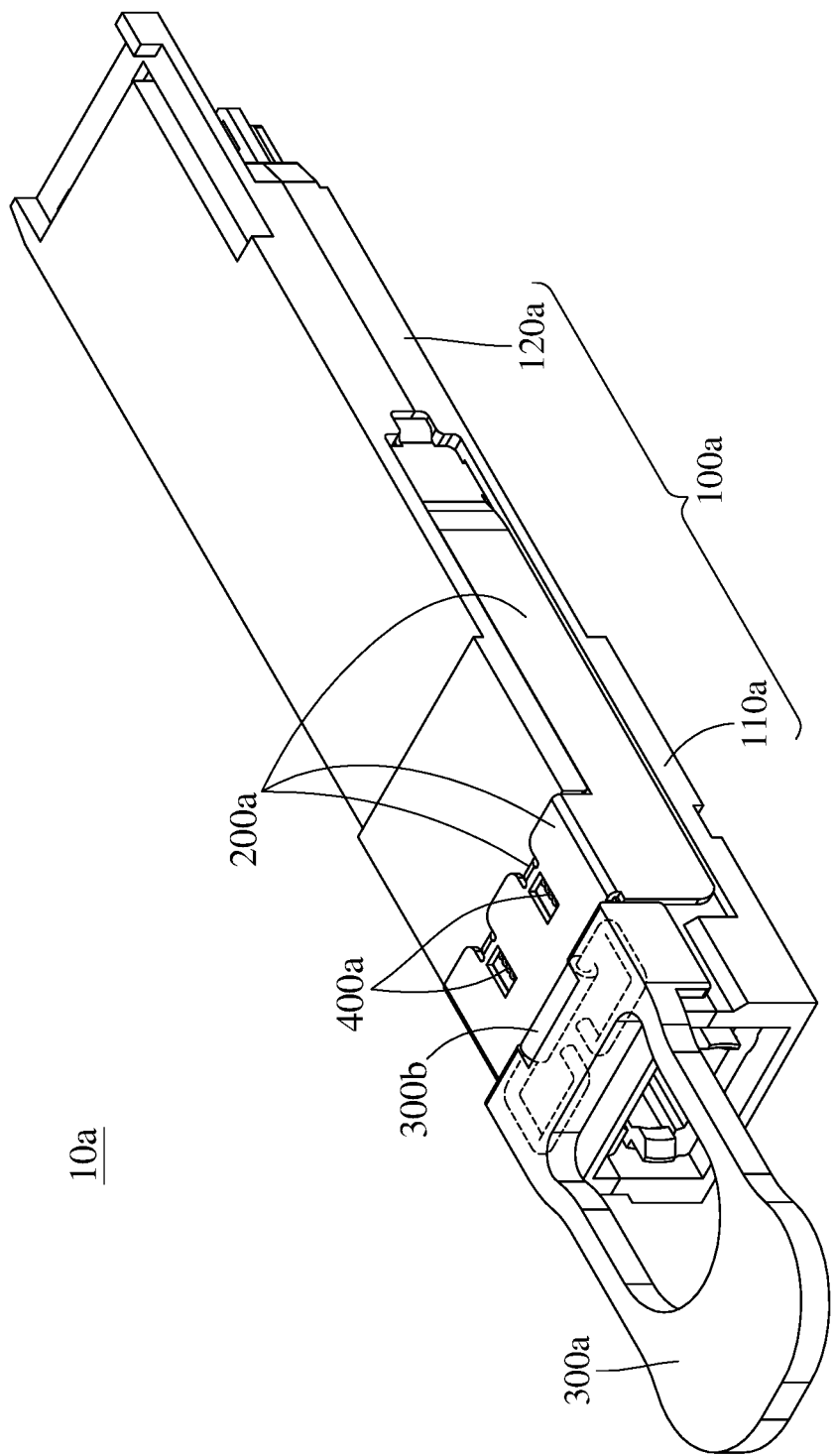
FIG. 4 is a perspective view of an optical transceiver according to a second embodiment of the present disclosure.
Figure 5:
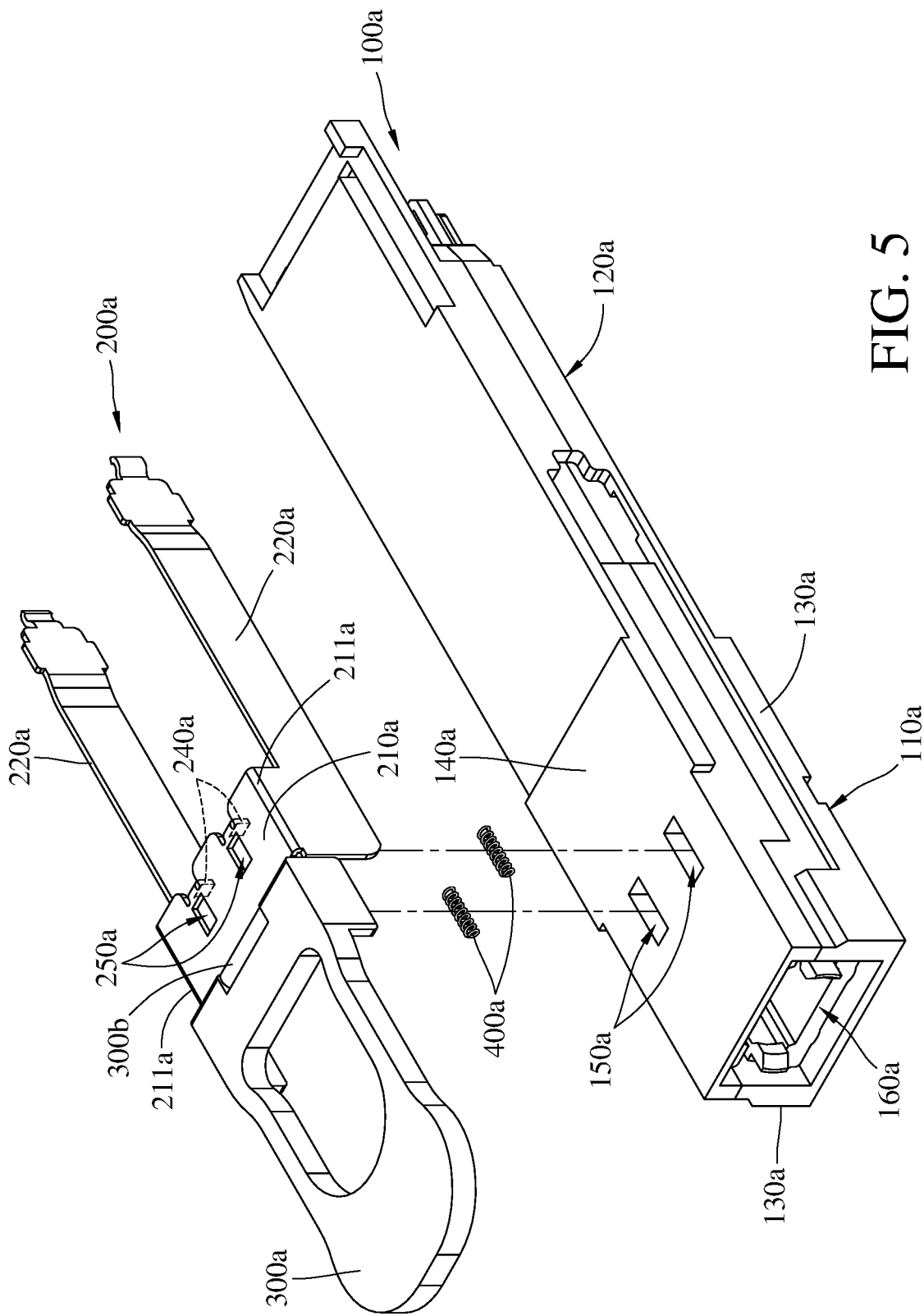
FIG. 5 is an exploded view of the optical transceiver in FIG. 4.

A configuration of the optical transceiver 10 could be improved. Please refer to FIG. 4 and FIG. 5. FIG. 4 is a perspective view of an optical transceiver according to a second embodiment of the present disclosure. FIG. 5 is an exploded view of the optical transceiver in FIG. 4. In this embodiment, an optical transceiver 10a is a QSFP-DD (Quad Small Form-factor Pluggable Double Density) optical transceiver, and the optical transceiver 10 is configured to be inserted into a cage (not shown in the drawings) in pluggable manner. The optical transceiver 10a includes a main body 100a, a fastening component 200a, a bail 300a, a pivot shaft 300b and two elastic components 400a.

Figure 6:
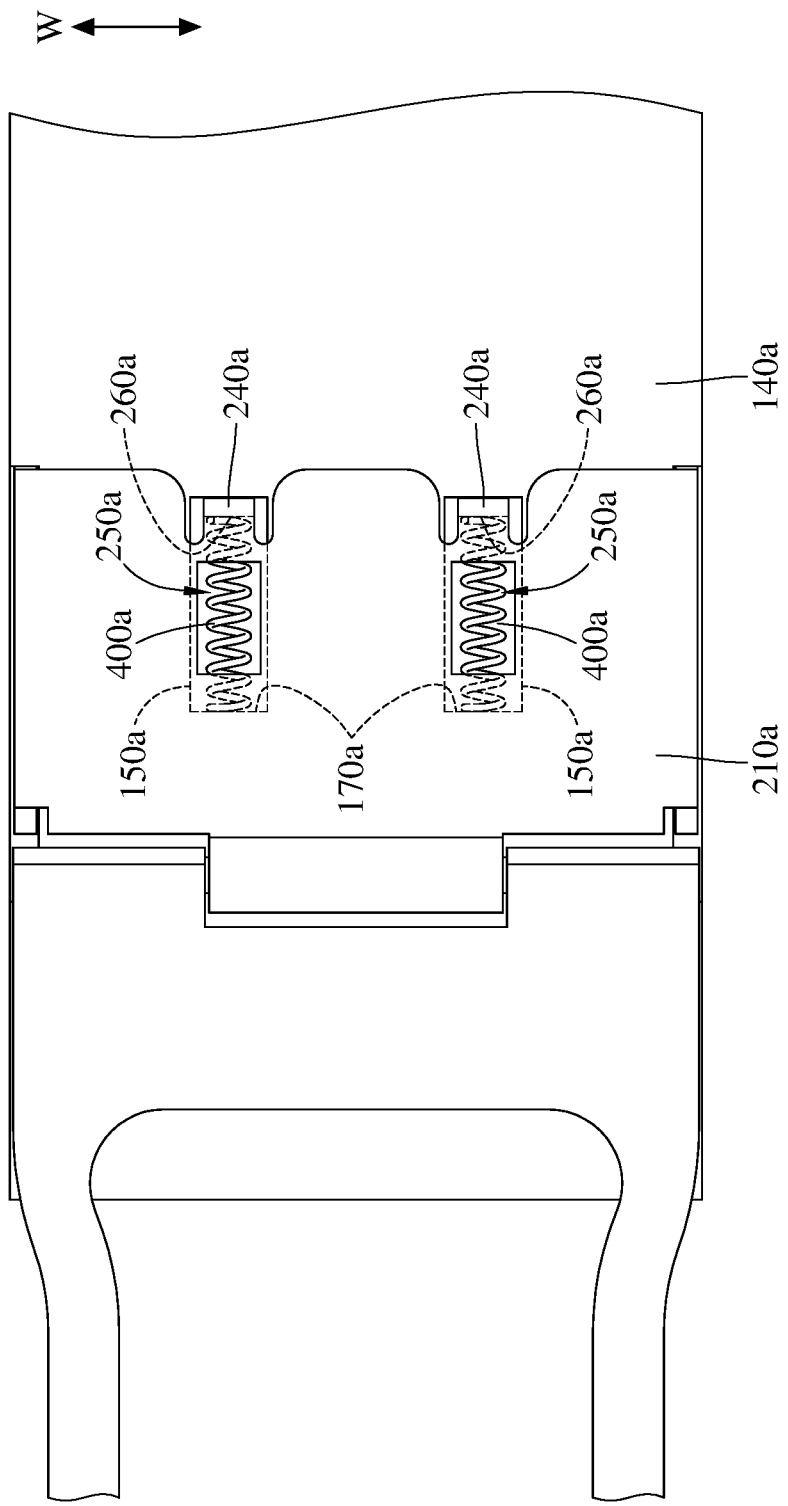
FIG. 6 is a partially enlarged cross-sectional view of the optical transceiver in FIG. 4 along line 6-6.
Figure 7:
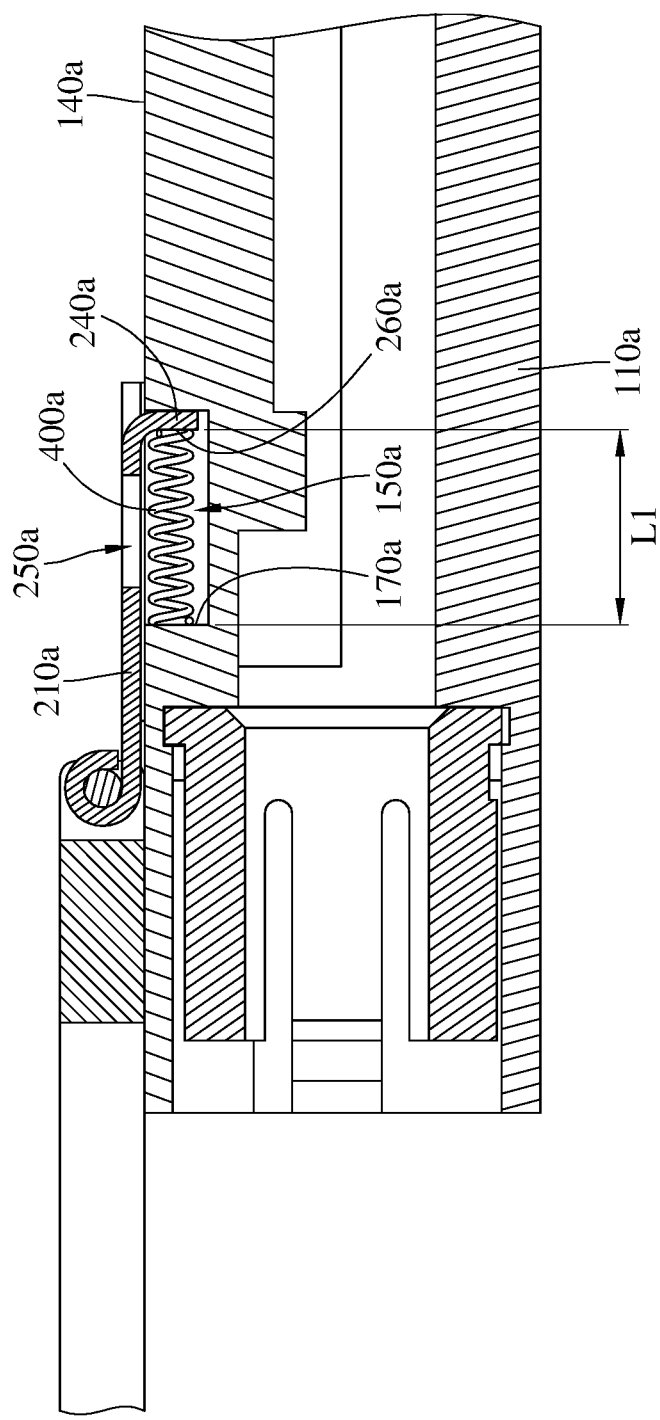
FIG. 7 is a partially enlarged cross-sectional view of the optical transceiver in FIG. 4 along line 7-7.

Please further refer to FIG. 6 and FIG. 7. FIG. 6 is a partially enlarged cross-sectional view of the optical transceiver in FIG. 4 along line 6-6. FIG. 7 is a partially enlarged cross-sectional view of the optical transceiver in FIG. 4 along line 7-7. The main body 100a includes a head portion 110a and an insertion portion 120a connected with each other. The head portion 110a of the main body 100a includes two lateral surfaces 130a, an outer surface 140a and an optical fiber terminal 160a. The outer surface 140a is between the two lateral surfaces 130a, and the outer surface 140a defines two confined grooves 150a which are spatially spaced apart from each other. The head portion 110a of the main body 100a further includes two first confined surfaces 170a with the two confined grooves 150a formed respectively. In this embodiment, the outer surface 140a is a top surface on an upper cover of the main body 100a, but the disclosure is not limited thereto. In some other embodiments, the outer surface is a bottom surface on a bottom cover of the main body 100a. An accommodation space inside the main body 100a allows for placement of components such as the optical fiber terminal 160a, a circuit board, photodiodes, laser emitters, and IC chips.

The fastening component 200a is movably disposed on the main body 100a and includes a linkage arm 210a, two extending arms 220a and two confined portions 240a. The two extending arms 220a are respectively connected with two opposite ends of the linkage arm 210a, such that the linkage arm 210a is located between the two extending arms 220a. The two extending arms 220 are movably disposed on the lateral surfaces 130a respectively, and the extending arms 220 are detachably fasten-able with the cage. The linkage arm 210a is disposed on the outer surface 140a of the main body 100a, and the linkage arm 210a includes two openings 250a respectively connected with the two confined groove 150a. The two confined portions 240a are connected with the linkage arm 210a, and the two confined portions 240a respectively extend into the confined grooves 150a. In this embodiment, a process of stamping is performed to cut and deform part of the linkage arm 210a to form the confined portions 240a and the openings 250a of the fastening component 200a. The opening 250a is located in proximity of the confined portion 240a.

Figure 8:
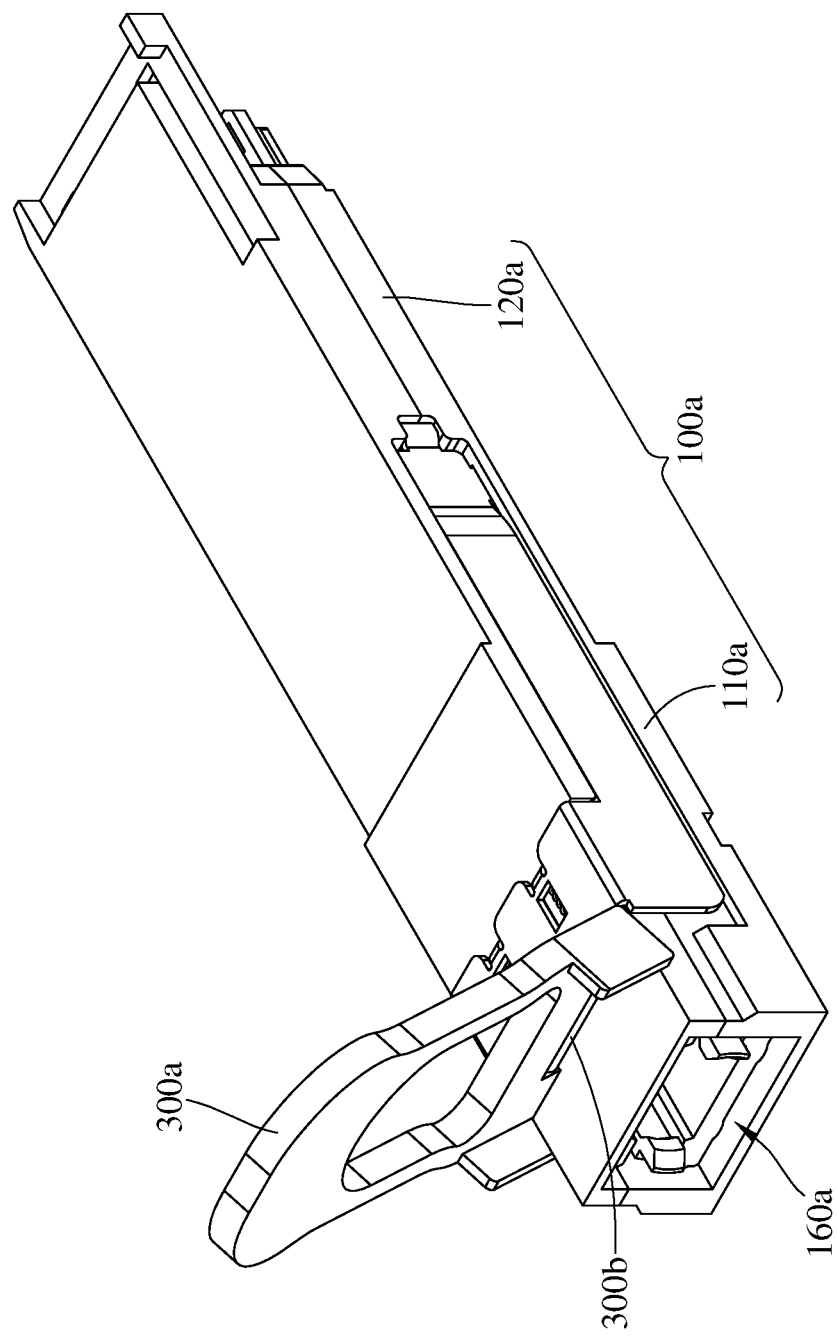
FIG. 8 is a perspective view of the optical transceiver in FIG. 4, with a bail at an upright position.

The pivot shaft 300b is pivoted on the linkage arm 210a of the fastening component 200a, and the bail 300a disposed on the pivot shaft 300b. FIG. 8 is a perspective view of the optical transceiver in FIG. 4, with a bail at an upright position. The bail 300a extends outside from the main body 100a. When the bail 300a is at a horizontal position, the bail 300a protects the optical fiber terminal 160a from dust, and the insertion portion 120a of the main body 100a is removed from the cage when the horizontal bail 300a is drawn. The bail 300a could be moved from the horizontal position to an upright position so as render convenient installation or removal of the optical fibers without requiring the bail 300a being held manually or by other means. With the pivot shaft 300b, the bail 300a could stay at the upright position even without any application of the external force to the bail 300a.

Each of the elastic components 400a, for example, is a spring compressed by the confined portion 240a of the fastening component 200a. In detail, each confined portion 240a of the fastening component 200a includes a second confined surface 260a facing toward the first confined surface 170a of the main body 100a. The elastic component 400a is disposed between the first confined surface 170a and the second confined surface 260a. When the fastening component 200a moves relative to the main body 100a, the confined portion 240a moves in the confined groove 150a and compresses the elastic component 400a.

It is worth noting that numbers of the confined grooves 150a, the extending arms 220a, the confined portions 240a, the openings 250a and the elastic components 400a are not limited because of the embodiments discussed in the present disclosure.

The opening 250a of the fastening component 200a exposes the elastic component 400a to outside. In detail, a method of positioning the elastic component 400a in the confined groove 150a is to compress the elastic component 400a by hand, and then put the elastic component 400a into the confined groove 150a through the opening 250a. Therefore, the elastic component 400a could be mounted or unmounted with more efficiency. As shown in FIG. 7, to maintain the position of the elastic component 400a, a size of the opening 250a is smaller than a length L1 of the elastic component 400a in an uncompressed condition. The uncompressed condition is a condition that the confined portion 240a of the fastening component 200a does not compress the elastic component 400a.

Furthermore, as shown in FIG. 5, the opening 250a is located between two ends 211a of the linkage arm 210a where the two extending arms 220a are respectively connected. Therefore, the opening 250a does not formed at an edge of the linkage arm 210a, such that it is favorable for an easier manufacture of the fastening component 200a since the edge of the linkage arm 210a is difficult to be processed due to higher internal stress.

According to the present disclosure, in the second embodiment, the elastic component 400a is disposed in the confined groove 150a, and the confined groove 150a is formed on the top surface of the main body 100a rather than on the lateral surface 130a. Therefore, more accommodation space inside the main body 100a could be provided in a width direction W to accommodate electronic components for high-speed communication, thereby meeting the requirements of compact optical transceiver 10a and proper space utilization of the same.

The embodiments are chosen and described in order to best explain the principles of the present disclosure and its practical applications, to thereby enable others skilled in the art to best utilize the present disclosure and various embodiments with various modifications as are suited to the particular use that is being contemplated. It is intended that the scope of the present disclosure is defined by the following claims and their equivalents.

What is claimed is:

1. An optical transceiver, configured to be inserted into a cage in a pluggable manner, comprising:
   a main body comprising two lateral surfaces and an outer surface between the two lateral surfaces, and the outer surface defining a confined groove;
   an elastic component disposed in the confined groove; and
   a fastening component movably disposed on the main body, the fastening component comprising a linkage arm, two extending arms and a confined portion, wherein the linkage arm is disposed on the outer surface of the main body, and wherein the linkage arm comprises an opening in communication with the confined groove of the main body to allow the elastic component to pass through the opening and be disposed in the confined groove, the two extending arms are connected with the linkage arm, the two extending arms are respectively disposed on the two lateral surfaces, the confined portion is connected with the linkage arm and extends into the confined groove in order to press the elastic component, and the two extending arms are detachably fasten-able with the cage.

2. The optical transceiver according to claim 1, wherein the outer surface is either a top surface or a bottom surface of the main body.

3. The optical transceiver according to claim 1, wherein the main body comprises a first confined surface forming the confined groove, the confined portion of the fastening component comprises a second confined surface facing toward the first confined surface, and the elastic component is disposed between the first confined surface and the second confined surface.

4. The optical transceiver according to claim 1, wherein a size of the opening is smaller than a length of the elastic component in an uncompressed condition.

5. The optical transceiver according to claim 1, wherein the opening is located between two ends of the linkage arm where the two extending arms are connected.

6. The optical transceiver according to claim 1, wherein the confined portion and the opening of the fastening component are formed by stamping.

7. The optical transceiver according to claim 1, wherein the main body comprises a head portion and an insertion portion connected with each other, the insertion portion is configured to be inserted into the cage in a pluggable manner, the head portion comprises the outer surface, the two lateral surfaces and an optical fiber terminal.

8. The optical transceiver according to claim 1, further comprising a pivot shaft pivoted on the linkage arm of the fastening component and a bail connected with the pivot shaft.

9. The optical transceiver according to claim 1, wherein the optical transceiver is a QSFP-DD (Quad Small Formfactor Pluggable Double Density) optical transceiver.

10. An optical transceiver, comprising:
    a main body comprising two lateral surfaces and an outer surface between the two lateral surfaces, and the outer surface defining two confined grooves spaced apart from each other;
    two elastic components disposed in the two confined grooves, respectively; and
    a fastening component movably disposed on the main body, the fastening component comprising a linkage arm, two extending arms and two confined portions, wherein the linkage arm is disposed on the outer surface of the main body, and wherein the linkage arm comprises an opening in communication with the confined groove of the main body to allow the elastic component to pass through the opening and be disposed in the confined groove, the two extending arms are connected with the linkage arm, the two extending arms are respectively disposed on the two lateral surfaces, the confined portions are connected with the linkage arm and respectively extend into the two confined grooves in order to press the two elastic components.

11. An optical transceiver, configured to be inserted into a cage in a pluggable manner, comprising:
- a main body comprising two lateral surfaces and an outer surface between the two lateral surfaces, and the outer surface defining a confined groove;
- an elastic component disposed in the confined groove;
- a fastening component movably disposed on the main body, the fastening component comprising a linkage arm, two extending arms and a confined portion, wherein the linkage arm is disposed on the outer surface of the main body, and wherein the linkage arm comprises an opening in communication with the confined groove of the main body to allow the elastic component to pass through the opening and be disposed in the confined groove, the two extending arms are connected with the linkage arm, the two extending arms are respectively disposed on the two lateral surfaces, the confined portion is connected with the linkage arm and extends into the confined groove in order to press the elastic component, and the two extending arms are detachably fasten-able with the cage; and
- a pivot shaft pivoted on the linkage arm of the fastening component and a bail connected with the pivot shaft, the bail having a horizontal position to allow the bail to be drawn for removal of the optical transceiver from the cage, and an upright position to allow for installation or removal of optical fibers into the optical transceiver.

12. The optical transceiver of claim 11, wherein the bail is configured to remain in the upright position without application of external force.

* * * * *